T. MUIR.
BRAKE.
APPLICATION FILED NOV. 10, 1908.

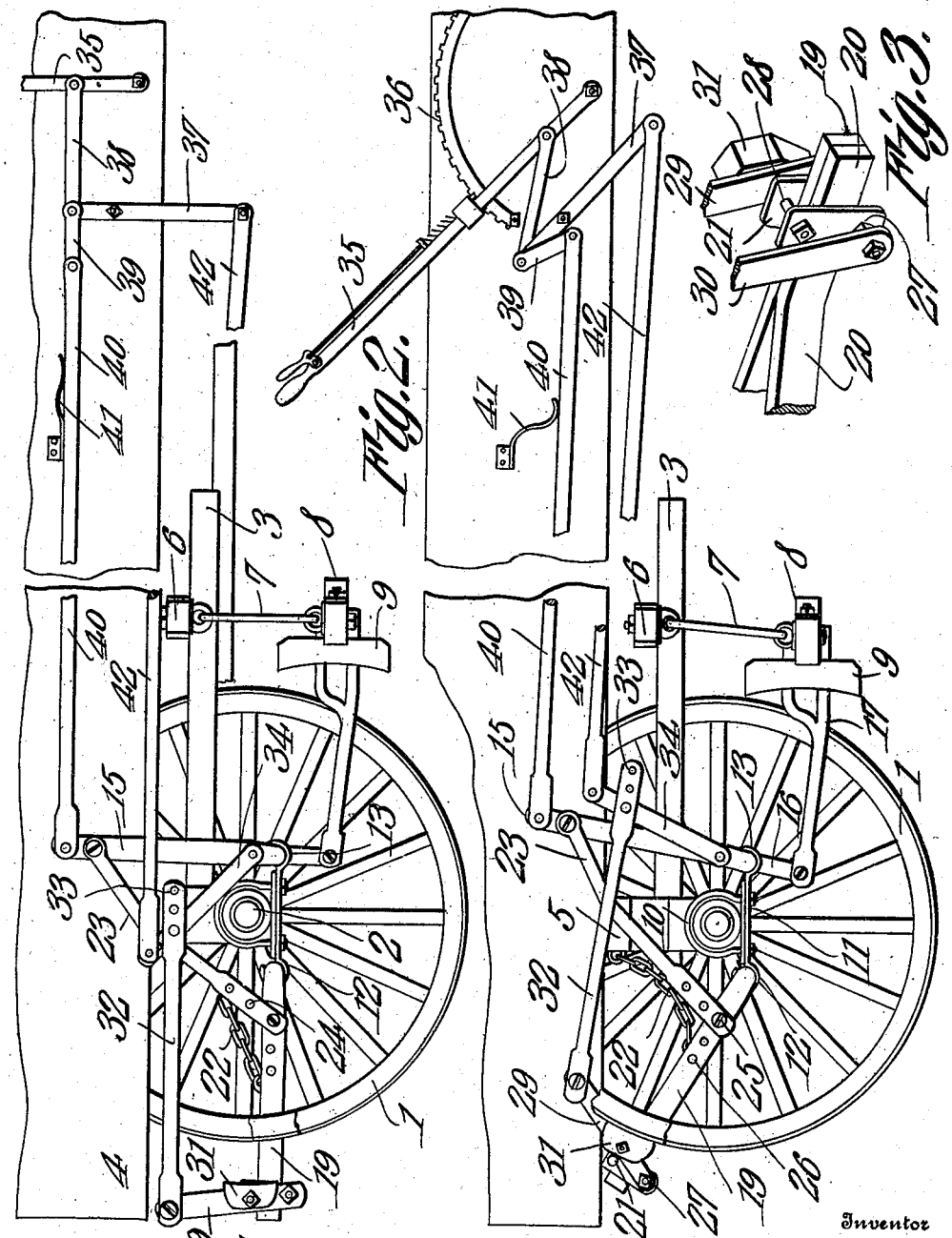

923,987.

Patented June 8, 1909.
2 SHEETS—SHEET 2.

Witnesses

Mason B. Lawton

Inventor
Thomas Muir.
By C. A. Snow & Co.
Attorneys

UNITED STATES PATENT OFFICE.

THOMAS MUIR, OF LIND, WASHINGTON.

BRAKE.

No. 923,987.  Specification of Letters Patent.  Patented June 8, 1909.

Application filed November 10, 1908. Serial No. 461,890.

*To all whom it may concern:*

Be it known that I, THOMAS MUIR, a citizen of the United States, residing at Lind, in the county of Adams and State of Washington, have invented a new and useful Brake, of which the following is a specification.

The objects of the invention are, generally, the provision, in a merchantable form, of a device of the above mentioned class, which shall be inexpensive to manufacture, facile in operation, and devoid of complicated parts; specifically, the provision of brake mechanism the shoe of which may be brought into contact with the periphery of the wheel in a substantially horizontal position, and travel upward with the periphery of the wheel as it moves, with increasing effect; the provision of novel means for operating such brake, and for operatively connecting it with other braking instrumentalities; other and further objects being made manifest hereinafter as the description of the invention progresses.

The invention consists in the novel construction and arrangement of parts hereinafter described, delineated in the accompanying drawings, and particularly pointed out in the appended claims, it being understood that divers changes in the form, proportions, size, and minor details of the structure may be made, without departing from the spirit or sacrificing any of the advantages of the invention.

Similar numerals of reference are employed to denote corresponding parts through the several figures of the drawings.

Figure 4:
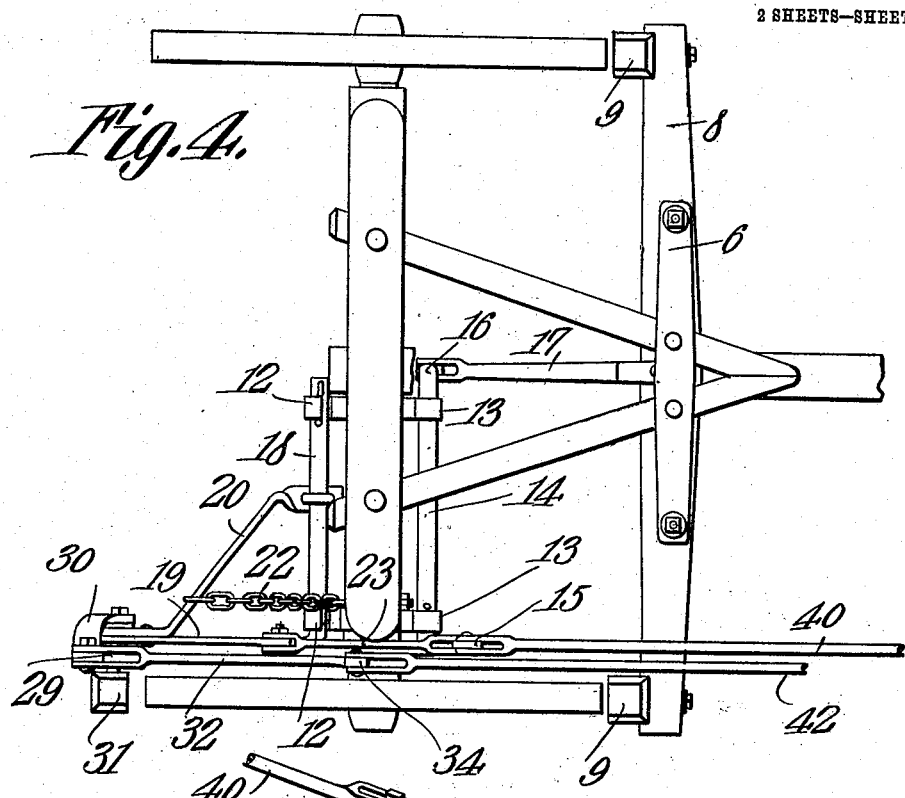
Figure 5:
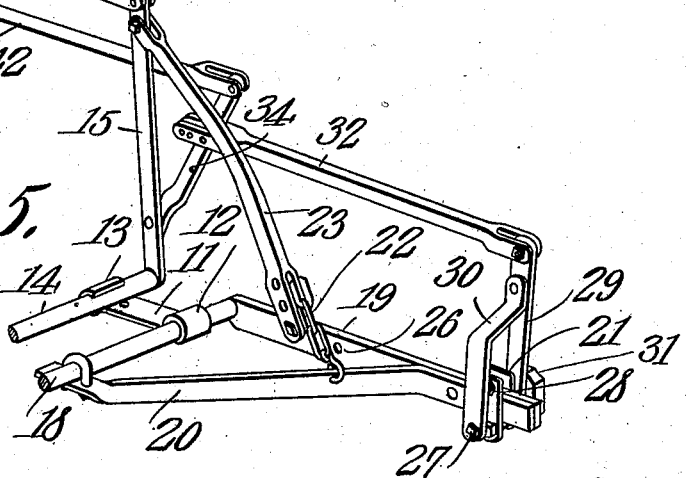

In the accompanying drawings:—Figure 1 shows my invention in side elevation, the brake shoes 9 and 31 being free from the periphery of the wheel; Fig. 2 is a side elevation, wherein the shoe 31 is shown as locked upon the wheel, and the shoe 9 in a position operative to engage the wheel upon a slight continued movement of the shoe 31; Fig. 3 is a detail perspective, showing the method in which the brake shoe 31 is mounted; Fig. 4 is a top plan; Fig. 5 is a detail perspective, showing the means whereby the brake shoe 9 is operatively connected with the brake shoe 31.

In the accompanying drawings the numeral 1 denotes the rear wheel of a vehicle; 2 is the axle thereof; 3 is the rear hound; 4 the wagon box; and 5 the bolster.

In carrying out my invention, I mount transversely upon the rear hound 3, a supporting member 6, from which is pivotally suspended, by links 7, or equivalent devices, a brake beam 8, carrying at its terminals brake shoes 9 arranged to bear upon the periphery of the wheel 1. U-shaped clamps 10 embrace the axle 2, one of said clamps being located near the middle of the axle and one near the end thereof. Connecting the ends of the U-shaped clamps 10, and rigidly held against the lower face of the axle 2, are plates 11, having mounted upon their remote ends bearings 12 and 13. Rotatably mounted in the bearings 13 is a shaft 14, having at its terminals oppositely disposed arms 15 and 16, and a rigid member 17 has its rear end pivotally connected with the terminal of the inner arm 16, having its forward end bifurcated and pivotally connected with the brake beam 8.

Rotatably mounted in the rear bearing 12 is a shaft 18, carrying, at its outer terminal an arm 19, extending to the rear of the axle 2. A diagonally disposed brace 20 has its forward end rigidly attached to the shaft 18, its rear end being bent parallel to the rear end of the arm 19, and held in close relation thereto by clamping plates 21. A flexible element 22 connects the brace 20 with the bolster 5 and serves to prevent the arm 19 from dropping below a horizontal plane. A connecting member 23 is shown, having its ends bifurcated, the forward end of the member 23 being pivotally connected with the arm 15, near its upper terminal. The rear end of the member 23 is provided with apertures 24, through which is passed a pin 25 arranged to register successively in apertures 26 in the arm 19, whereby the rear end of the member 23 may be adjustably and pivotally connected with the said arm 19.

A bolt 27 passes transversely through the plates 21 near their lower ends, and with the bolts 28 serves to draw the plates 21 toward each other. Upon the outer end of the bolt 27 is pivoted a straight lever 29, having a bent arm 30 projecting downward from its inner side into pivotal mounting upon the inner end of the bolt 27. The lever 29 has pivotally mounted upon it a brake shoe 31, arranged to engage the periphery of the wheel 1. A connecting rod 32 has its rear end pivotally connected with the upper terminal of the lever 29, the forward end of the rod 32 being provided with apertures 33, through which may be passed successively, suitable means whereby an adjustable, pivotal connection may be effected between the rod 32 and a rock-arm 34, which is pivoted to the arm 15 near the lower end thereof.

The means for operating my device may be of any form; however, in order to provide a concrete embodiment, and to show a complete and operative structure, I have delineated in Fig. 2 an operating lever 35, arranged to coöperate with a segment 36, both carried by the forward end of the box 4, and of the usual form. A lever 37 is mounted upon the side of the box, being pivoted thereto intermediate its ends, a connecting member 38 uniting the upper end of the lever 37 with the operating lever 35. An arm 39 depends pivotally from the upper terminal of the lever 37, the lower end of the arm 39 being pivoted to the upper operating rod 40, having its rear end pivotally connected with the upper end of the arm 15. A resilient sigmoidal tongue 41 has one of its terminals rigidly mounted upon the box 4, its free end being arranged to bear upon the upper face of the operating rod 40. A lower operating rod 42 is shown having its forward end pivotally connected with the lower end of the lever 37, its rear end being pivotally connected with the upper terminal of the rock-arm 34 above the connection between the members 34 and 32.

Let it be supposed that, as shown in Fig. 1, both the brake shoes 9 and 31 are free from the periphery of the wheel 1; then the operation of the device in setting the brakes, is as follows:—When the operating lever 35 is thrown backward from the upright position shown in Fig. 1 to that shown in Fig. 2, the lower end of the lever 37 will move forward, carrying with it the lower operating rod 42, the rock-arm 34 will tilt forward, carrying with it the connecting rod 32, which, in its turn, will cause the lever 29 to move pivotally upon its bearing 27, bringing the brake shoe 31 against the periphery of the wheel 1 at a point substantially opposite the axle 2 and in a common horizontal plane therewith. As the shoe 31 engages the periphery of the wheel 1, it will ride upwardly and upon the said wheel to the position shown in Fig. 2. When the shoe 31 is in the position shown in Fig. 2, it is nearly at the limit of its upward travel, and, as hereinafter described, the shoe 9 has been brought into close relation with the periphery of the wheel. A slight further upward movement of the shoe 31 from the position shown in Fig. 2 will throw the shoe 9 from the position shown in Fig. 2 into a close clamping relation with the periphery of the wheel. Now, it is obvious that the periphery of the wheel 1 and the brake shoe 31 move in circles which are of different radii and non-concentric, and that as the shoe 31 moves upward with the wheel 1, it will be drawn more and more tightly upon the said wheel, as it, the said brake shoe is carried upward.

When the brake shoe 31 moves upward with the wheel as hereinbefore described, it will carry with it in its upward movement the lever 29 and the arm 19, which, through the plates 21 and the bolt 27 is pivotally connected therewith. As the arm 19 moves upward, it will carry with it the connection 23, which, in its turn, will cause the arm 15 to move forward, rocking the shaft 14 and carrying the arm 16 backward. The arm 16 in its backward movement will draw with it the member 17 and the brake-beam 8, setting the shoes 9 upon the rim of the wheel. It will thus be seen that by a single rearward movement of the operating lever 35, both of the shoes 9 and 31 will be set.

The above operation is descriptive of the action of the device, when an emergency or locking function is demanded. Let it be supposed however that it is desired to obtain the effect of the shoe 9 alone, and that the device is in the position shown in Fig. 1. Then the operation of the device is as follows:—The operating lever 35 is drawn forward, carrying with it the members 38, 39 and 40. The arm 15 will move forward, rocking the shaft 14 and moving the arm 16, carrying the member 17 rearward, and with it the brake-beam 8 and the brake shoes 9, bringing the said shoes 9 against the periphery of the wheel. Now, as the arm 15 tilts forward it will carry with it the connection 23, raising the arm 19. The shoe 31 however will not engage the periphery of the wheel, for the reason that, as the operating rod 40 is brought forward to set the shoe 9, the operating rod 42 is moving rearward, carrying with it the rock-arm 34, the connecting rod 32 and the lever 29, swinging the shoe 31 away from the periphery of the wheel.

When the operating lever 35 is thrown backward to set the brakes, as shown in Fig. 2, the connections between the arm 15 and the operating lever 35 must not be a rigid one, and to this end I have interposed the arm 39 between the members 40 and 38.

Referring to Fig. 1, it will be seen that, just before the back stroke of the operating lever 35 is begun, the parts 38, 39 and 40 are alined, and that, if they remain so, they will form a rigid connection between the operating lever 35 and the arm 15, interfering with the operation of the device. I have found, in practice, that the weight of the operating arm 40 is usually sufficient to cause it to drop out of the position shown in Fig. 1. However, in order to obviate the possibility of the members 38, 39 and 40 remaining in alinement, I have provided the resilient tongue 41, arranged to secure positively, the downward movement of the rod 40, when the operating lever 35 is thrown backward. By making adjustable, the connection between the members 23 and 19, and the connection between the members 32 and 34, the position of the brake shoe 31, both while it is at rest and while it is in its upward travel upon the rim of the wheel, may be adjusted.

Having thus described my invention, what I claim as new, and desire to protect, by Letters Patent, is:—

1. The combination with the wheel and axle of a vehicle, of forward and rearward shafts rotatably carried by the axle and eccentric therewith; arms terminally mounted upon the shafts, braking mechanism operatively connected with the forward shaft and arranged to be set by its rotation; a brake shoe carried by the arm of the rearward shaft and being arranged to engage the periphery of the wheel and to travel upward with the rim of the wheel; a connection adjustably uniting the arms and arranged to rotate the forward shaft upon the up travel of the brake shoe.

2. The combination with the wheel and axle of a vehicle, of forward and rearward shafts rotatably mounted upon the axle and eccentric therewith; arms carried by the terminals of the shafts; a lever pivoted to the arm of the rearward shaft; a brake shoe carried by the lever and arranged to contact with the periphery of the wheel; a rock-arm pivoted to the arm of the forward shaft; a connecting rod adjustably uniting the lever with the rock-arm; means for operating the rock-arm.

3. The combination with the wheels, axle and hounds of a vehicle, of forward and rearward shafts rotatably mounted upon the axle and eccentric therewith; brake mechanism suspended from the hounds and operatively connected with the forward shaft; arms carried by the terminals of the shafts; a lever pivoted to the arm of the rearward shaft; a brake shoe carried by the lever; a rock-arm pivoted to the arm of the forward shaft; a connecting rod adjustably uniting the rock-arm with the lever; a connection adjustably uniting the arms of the forward and rearward shafts; means for operating the rock-shaft; means for operating the arm of the forward shaft.

In testimony that I claim the foregoing as my own, I have hereto affixed my signature in the presence of two witnesses.

THOMAS MUIR.

Witnesses:
J. W. HENDERSON,
CHARLES BRADLEY.